United States Patent [19]

Guichard et al.

[11] Patent Number: 5,142,562
[45] Date of Patent: Aug. 25, 1992

[54] SOUND AND VISION COMMUNICATIONS TERMINAL INCLUDING AN AUXILIARY LIGHTING DEVICE

[76] Inventors: Jacques Guichard, 8-10, rue des Morrillons, 75015 Paris; Georges Buchner, rue de Picpus, 75012 Paris; Alain Isckia, 227 rue Julian Grimao, 94400 Vitry S. Seine, all of France

[21] Appl. No.: 599,863

[22] Filed: Oct. 19, 1990

Related U.S. Application Data

[63] Continuation of Ser. No. 248,669, Sep. 26, 1988, abandoned.

[51] Int. Cl.⁵ .......................................... H04M 11/00
[52] U.S. Cl. .................................... 379/53; 379/434; 358/85
[58] Field of Search ............... 379/53, 54, 428, 434, 379/440, 436; 358/85, 224, 225, 228, 185; 354/221; 362/325, 319; 350/131

[56] References Cited

U.S. PATENT DOCUMENTS

| | | | |
|---|---|---|---|
| 2,420,198 | 5/1947 | Rosenthal | 358/85 |
| 2,909,600 | 10/1959 | Becker | 358/85 |
| 3,495,908 | 2/1970 | Rea | 358/85 |
| 3,544,715 | 12/1970 | Herriott | 358/85 |
| 3,567,848 | 3/1971 | Thies | 379/53 |
| 3,755,623 | 8/1973 | Cassagne | 379/53 |
| 3,843,835 | 10/1974 | Mosca | |
| 4,485,400 | 11/1984 | Lemelson et al. | 379/53 |
| 4,682,238 | 7/1987 | Cawthorne | 358/228 |
| 4,715,059 | 12/1987 | Cooper-Hart | 379/53 |
| 4,821,307 | 4/1989 | Flint, III | 379/53 |

FOREIGN PATENT DOCUMENTS

914843 10/1946 France .
0180283 7/1988 Japan .................................... 379/53

OTHER PUBLICATIONS

Y. Takemura et al, "Characteristics of the color TV Telephone", IEEE, Transactions on Broadcasting, vol. BC-19, No. 4, pp. 77-84, Dec., 1973.
P. Litz, "Video Liser's Handbook", Chapter 10, pp. 200-223 ©1980, Prentice Hall.

*Primary Examiner*—James L. Dwyer
*Assistant Examiner*—Wing F. Chan
*Attorney, Agent, or Firm*—Pollock, Vande Sande & Priddy

[57] ABSTRACT

A table-top terminal for sound and vision communications, of the type associated, in particular, with a telephone set, and comprising a case (100) containing: a display screen monitor (128), a camera (132) having a lens system (130), manual control means, and an electronic assembly for the purposes of control, coding/decoding, and interfacing with a transmission line, wherein, for the purpose of compensating the illumination of a speaker in an environment having overhead ambient lighting and thereby enabling the camera to obtain a balanced image of said speaker, the terminal further includes an auxiliary lighting device (160) having a general emission direction (C) which is essentially upwardly inclined towards the speaker, together with a mechanism for adjusting the light flux emitted by the device as a function of the ambient lighting.

16 Claims, 5 Drawing Sheets

SOUND AND VISION COMMUNICATIONS TERMINAL INCLUDING AN AUXILIARY LIGHTING DEVICE

This is a continuation of application Ser. No. 07/248,669, filed Sep. 26, 1988 now abandoned.

FIELD OF THE INVENTION

The present invention relates to telecommunications, and more particularly to a sound and vision communications terminal such as a videophone enabling a speaker to communicate both by sound and by image over a network with a distant speaker equipped with a similar terminal.

BACKGROUND OF THE INVENTION

In conventional manner, such a terminal includes a camera having a lens system, a monitor display screen, manual or automatic control means, and an electronic assembly for the purposes of control, coding/decoding, and interfacing with a transmission line.

The above set of equipment is housed in a box or case which is generally intended to be positioned on a table at which the speaker is sitting, but numerous other forms of support may be envisaged.

However, the image obtained by the camera of such a terminal suffers from a major drawback: given that both in daylight and under artificial lighting, ambient illumination generally comes from above the subject, the resulting image picked up by the camera suffers from very marked shadows, particularly on a speaker's face, and most particularly beneath the eyes. These shadows are unattractive, and this effect is further accentuated by the fact that image resolution is limited to about 150×200 pixels on low data rate lines.

A videophone-type terminal including its own light source has already been described in the prior art, for example in European Patent Application No. 0 231 403, in French Patent No. 914,843, and in U.S. Pat. No. 4,485,400. However, none of the terminals in these patents is suitable for compensating image defects due to overhead ambient illumination.

The present invention seeks to mitigate this drawback of the prior art and to provide a terminal of the above-specified type suitable for obtaining relatively uniform lighting over the face of the user, and thereby obtaining improved image quality.

SUMMARY OF THE INVENTION

To this end, the present invention provides a table-top terminal for sound and vision communications, of the type associated, in particular, with a telephone set, and comprising a case containing: a display screen monitor, a camera having a lens system, manual control means, and an electronic assembly for the purposes of control, coding/decoding, and interfacing with a transmission line, wherein, for the purpose of compensating the illumination of a speaker in an environment having overhead ambient lighting, and thereby enabling said camera to obtain a balanced image of said speaker, the terminal further includes an auxiliary lighting device having a general emission direction which is essentially upwardly inclined towards the speaker, together with means for adjusting the light flux emitted by said device as a function of the ambient lighting.

BRIEF DESCRIPTION OF THE DRAWINGS

Embodiments of the invention are described by way of example with reference to the accompanying drawings, in which.

DETAILED DESCRIPTION OF PREFERRED EMBODIMENTS

Figure 1:
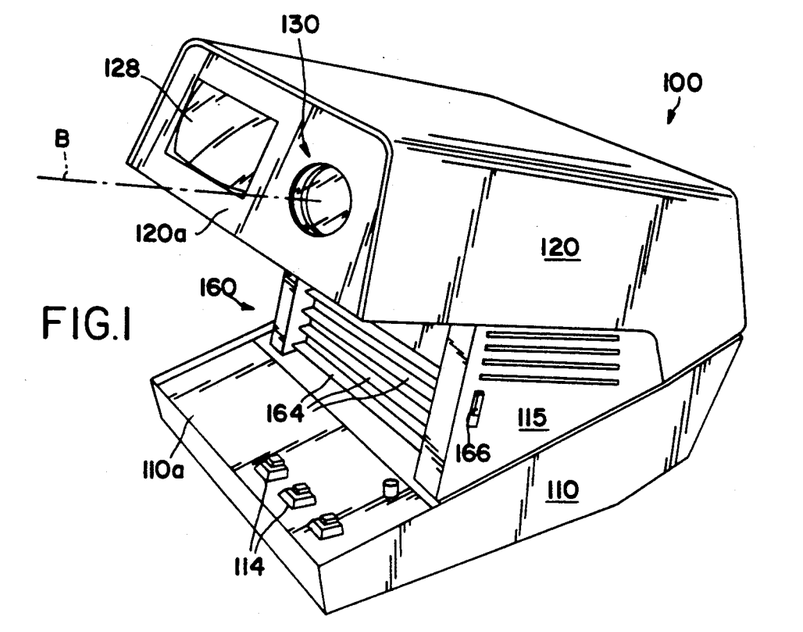
FIG. 1 is a diagrammatic perspective view of a first embodiment of a terminal in accordance with the invention.

FIG. 1 shows a terminal comprising a case 100 constituted by a bottom part 110 which is essentially horizontal and a top part 120 at a considerable slope relative to the first part, leaving an intermediate part 115 located between the top and bottom parts and having a cross-section which is essentially trapezoidal.

The top face 110a of the part 110 carries a set of manual control buttons 114, and said part 110 preferably houses an electronic assembly for the purposes of control, of coding/decoding the video means (camera and screen), and of interfacing with a transmission line.

The screen 128 of a display monitor, e.g., a cathode ray tube or a liquid crystal screen, and the lens system 130 of a video camera, e.g., a charged coupled device (CCD), are disposed side-by-side in the front face 120a of the top part 120 of the case.

This configuration is preferred since it enables pictures of the speaker to be taken from a substantial height above the table on which the terminal stands, and thus using an aiming direction which is close to horizontal, with the speaker simultaneously looking at the screen, i.e., at a point close to the camera lens system.

In accordance with a first essential aspect of the invention, the terminal includes auxiliary lighting means given an overall reference 160 for applying an upwardly directed beam of light towards the speaker, and in particular towards the speaker's face, thereby filling in the ambient lighting which generally comes from above, and thus eliminating shadows which are too prominent, particularly beneath the eyes of the user, and thus improving the quality of the transmitted image.

In the FIG. 1 embodiment, the device 160 comprises a light source (not shown) such as an incandescent lamp, for example a halogen lamp or a discharge lamp, together with a set of adjustable horizontal louvers 164 for varying the direction and/or the intensity of the light beam. To this end, the louvers are pivotally mounted in the walls of the intermediate part 115 of the case, and a control button 166 enables their inclination to be varied by means of a suitable set of rodding (not shown).

Figure 2:
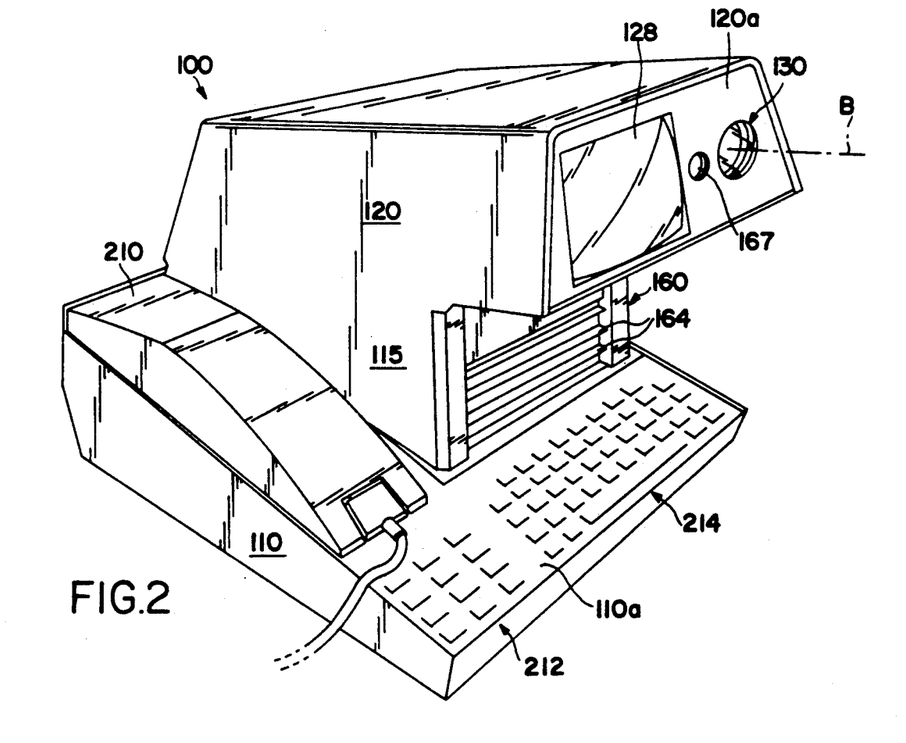
FIG. 2 is a diagrammatic perspective view of a second embodiment of the invention.

FIG. 2 shows a terminal similar to that shown in FIG. 1, and the same reference numerals are used to designate those portions or elements which are identical or similar.

The major difference relative to the FIG. 1 terminal lies in the fact that the FIG. 2 terminal includes an integral telephone or videotex type terminal.

To this end, it includes a telephone handset 210 resting on a lateral extension of the part 110 of the case, a dialing keypad 212 and an alphanumeric keypad 214 which are both provided on the top face 110a of said part 110.

FIG. 2 also shows a photosensitive cell 167 such as a photoresistor or a photodiode which is provided in the front face 120a close to the camera lens system 130 for purposes explained below.

Figure 3A:
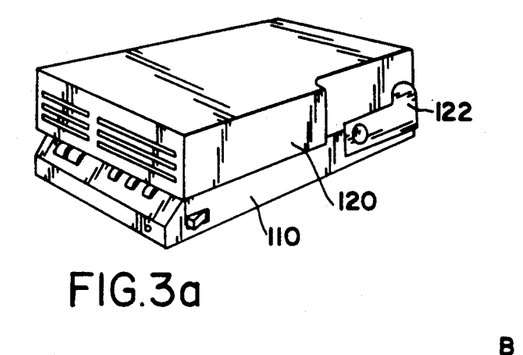
FIGS. 3a and 3b are diagrammatic perspective views of a terminal comprising a third embodiment of the invention, said views showing the terminal respectively in a standby position and in a utilization position.
Figure 3B:
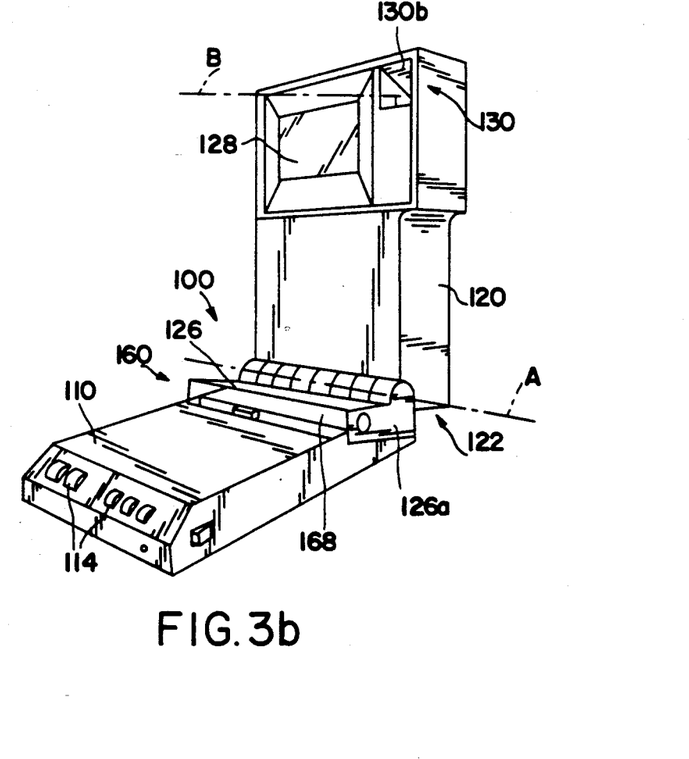

FIGS. 3a and 3b show a third embodiment of a videophone type terminal in accordance with the invention.

It comprises a case 100 constituted by two parts 110 and 120 which are generally rectangular in shape and which are connected to each other, in the present example, by means of a hinge 122 about an axis A which is essentially horizontal.

The part 110 which rests directly on a support surface includes a set of control buttons and knobs 114 at its front end and it houses the electronics of the terminal.

In the FIG. 3b open position, the top portion of the part 120 contains the screen 128 and the lens system 130 of the camera. The camera is disposed vertically inside the moving part 120 and the lens system optics includes a mirror 130b inclined at about 45°.

Finally, an auxiliary lighting device 160 is provided in the rear region of the fixed part 110 of the case, close to the hinge connection 122, and it comprises a light source (not shown) received in an appropriate cavity, a translucent plate 168 closing the cavity, and an adjustable flap 126 hinged by two vertical side pieces 126a about the axis A of the hinged connection 122.

Finally, a linear slider 144 controls an electronic dimmer (not shown) for varying the intensity of the light delivered by the light source.

Preferably, the hinge 122 is of the snug fit type so that the moving part 120 may take up a first or "standby" position (FIG. 3a) in which it rests against the part 110 with the screen 128 and the camera lens system 130 thus being protected from the environment and with the terminal occupying a small amount of space, and any one of an large number of utilization positions (FIG. 3b) in which the moving part 120 is moved away from the fixed part 110.

The aiming direction B of the camera is adjusted by varying the inclination of the moving part 120 about the axis A, thereby making it extremely simple and easy to adapt the terminal to users of different stature or posture.

For further details concerning this embodiment, reference should be made to co-pending U.S. patent application Ser. No. 249,134, filed Sep. 26, 1988 and entitled "A hinged-case sound and vision communications terminal, in particular a videophone".

FIGS. 4 to 7 show various embodiments of the auxiliary lighting device incorporated in a video terminal in accordance with the present invention, and more particularly in a terminal in accordance with the first or second embodiments of the present invention.

Figure 4:
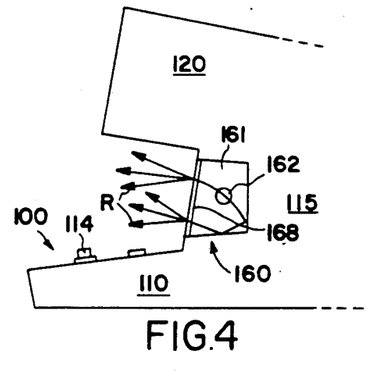
FIG. 4 is a diagrammatic fragmentary side view in section through a first embodiment of the lighting means.

With reference initially to FIG. 4, the auxiliary lighting device 160 comprises a cavity 161 having reflecting walls and containing a light source 162, e.g., in the form of a tube. The front of the cavity is closed by a translucent plate 168 constituting a diffuser, which plate may optionally be colored, such that a multidirectional beam of light rays R is formed at the outlet from the device.

The upwardly directed rays encounter the top of the body of the speaker, thereby attenuating zones of shade, particularly those created on the face of the speaker by overhead lighting of the type normally encountered.

The downwardly directed rays illuminate the support surface of the terminal, e.g., a table, in front of the terminal, and thus provide advantageous auxiliary lighting enabling the user to read or write a document.

Figure 5:
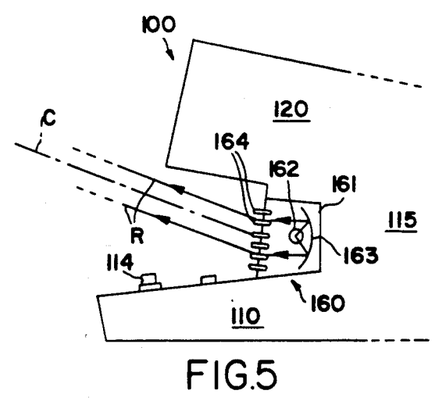
FIG. 5 is a diagrammatic fragmentary side view in section through a second embodiment of the lighting means.

In FIG. 5, the auxiliary lighting device comprises a cavity 161, containing a light source 162 associated with a reflector 163, e.g., of the parabolic type, for the purpose of generating a beam of light rays which are essentially parallel to a horizontal or near horizontal direction. This figure also shows a set of louvers 164 analogous to those shown in FIGS. 1 and 2 and serving to provide relatively uniform deflection, by reflection on their inside faces, of a substantial portion of the light rays, thereby establishing a beam of upwardly directly light rays at the outlet from the device propagating along a general emission direction C of selectable inclination.

This configuration of the auxiliary lighting means 160 is advantageous in that it allows the inclination of the upwardly directed beam to be adjusted as a function of the stature or posture of the speaker, merely by adjusting the position of the louvers.

Figure 6:
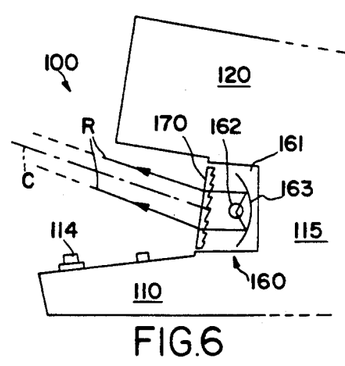
FIG. 6 is a diagrammatic fragmentary side view in section through a third embodiment of the lighting means.

FIG. 6 shows an auxiliary lighting device comprising, in addition to the light source 162 and the reflector 163 received in the cavity 161, a front glass 170 including a set of horizontal prisms which deviate the light beam by refraction so as to impart the desired upward inclination (axis C) thereto.

Figure 7:
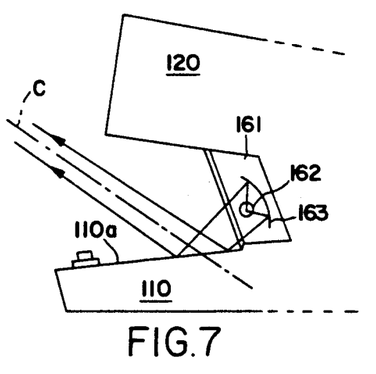
FIG. 7 is a diagrammatic fragmentary side view in section through a fourth embodiment of the lighting means.

Finally, in the lighting device shown in FIG. 7, the light source (lamp 162) emits light radiation which is directed essentially downwardly, e.g., by virtue of a reflector 163, towards the top surface 110a of the bottom part 110 of the case. This top surface reflects light sufficiently well to reflect these light rays, possibly together with a degree of diffusion, in an upward direction towards the speaker (axis C).

Thus, the surface 110a may include either a mirror or a layer of a coating having a high coefficient of reflection.

This solution is advantageous in that the above-mentioned diffusion effect may reduce the extent to which the speaker is dazzled. It also makes it possible to get round the top portion 120 of the case in the event the top portion overhangs a long way forward.

The lighting means may be constituted in any other way, and in particular may include concentrator means such as Fresnel lenses for forming the beam.

The lighting device 160 may be manually controlled by the user. For example, the inclination of the louvers may be controlled by the button 166 (FIG. 1), or the intensity of the light may be controlled by the cursor 144 (FIG. 3b), thereby modulating the auxiliary lighting as a function of the directivity and/or the intensity of the ambient lighting under, both natural and articial lighting.

In order to assist the user in correctly adjusting the lighting, it is particularly advantageous to provide a local image-checking function in the terminal enabling the speaker to observe his or her own image temporarily on the screen.

However, the auxiliary lighting device 160 may also be controlled automatically. For example, the sensor 167 in the front face (FIG. 2) may generate an electric signal representative of the average brightness of the user's face. This electrical signal can then be processed to control an electronic dimmer connected to the light source so as to modulate the delivered light intensity until the brightness measured by the sensor 167 reaches a reference value.

In the embodiments shown in FIGS. 1 and 2, such a signal may also be used, for example, to control an electric motor suitable for varying the inclination of the louvers 164.

When these louvers act merely as variable shutters, this serves to servo-control the quantity of auxiliary light delivered to the user as a function of the measured brightness.

In contrast, when the louvers act as variable light-ray deflectors, the direction of the auxiliary beam as generated is servo-controlled as a function of the measured brightness until it reaches the required value.

It is also possible to provide a plurality of cells having different directivities and serving to detect non-uniformity in the ambient lighting.

It may be observed here that the use of mechanical shutters such as the louvers has the advantage, regardless of the way in which the emitted light flux is modulated, that the spectral distribution of the light remains substantially constant, which is not always the case when light flux is varied electronically, e.g., by varying voltage. Thus, this mechanical solution makes it possible to avoid changing the chromatic equilibrium of the image and thus to avoid changing chromatic adjustments within the local or the distant terminal.

Figure 8:
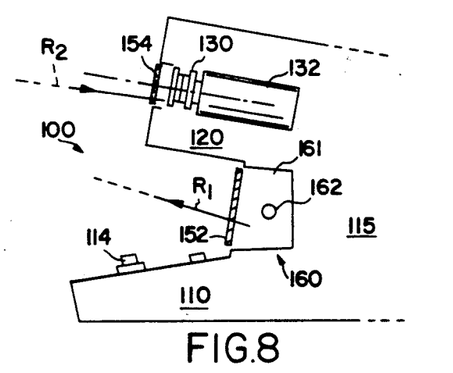
FIG. 8 is a diagrammatic fragmentary side view in section through an auxiliary arrangement in accordance with the invention.

According to yet another aspect of the present invention, and with reference to FIG. 8, means may be provided to prevent the above-described auxiliary lighting from giving rise to undesirable reflections in the image obtained, e.g., from the lenses of a pair of spectacles worn by the speaker.

These means preferably comprise a polarizer 152 which, in the present example, is disposed at the outlet from the cavity 161 receiving the auxiliary lighting device 160 used in conjunction with a receiving polarizer 154 disposed in front of the lens system 130 of the camera 132. The polarization may be linear or circular. This eliminates specular reflections from said spectacles, and thus avoids undesirable glinting.

Figures 10, 11:
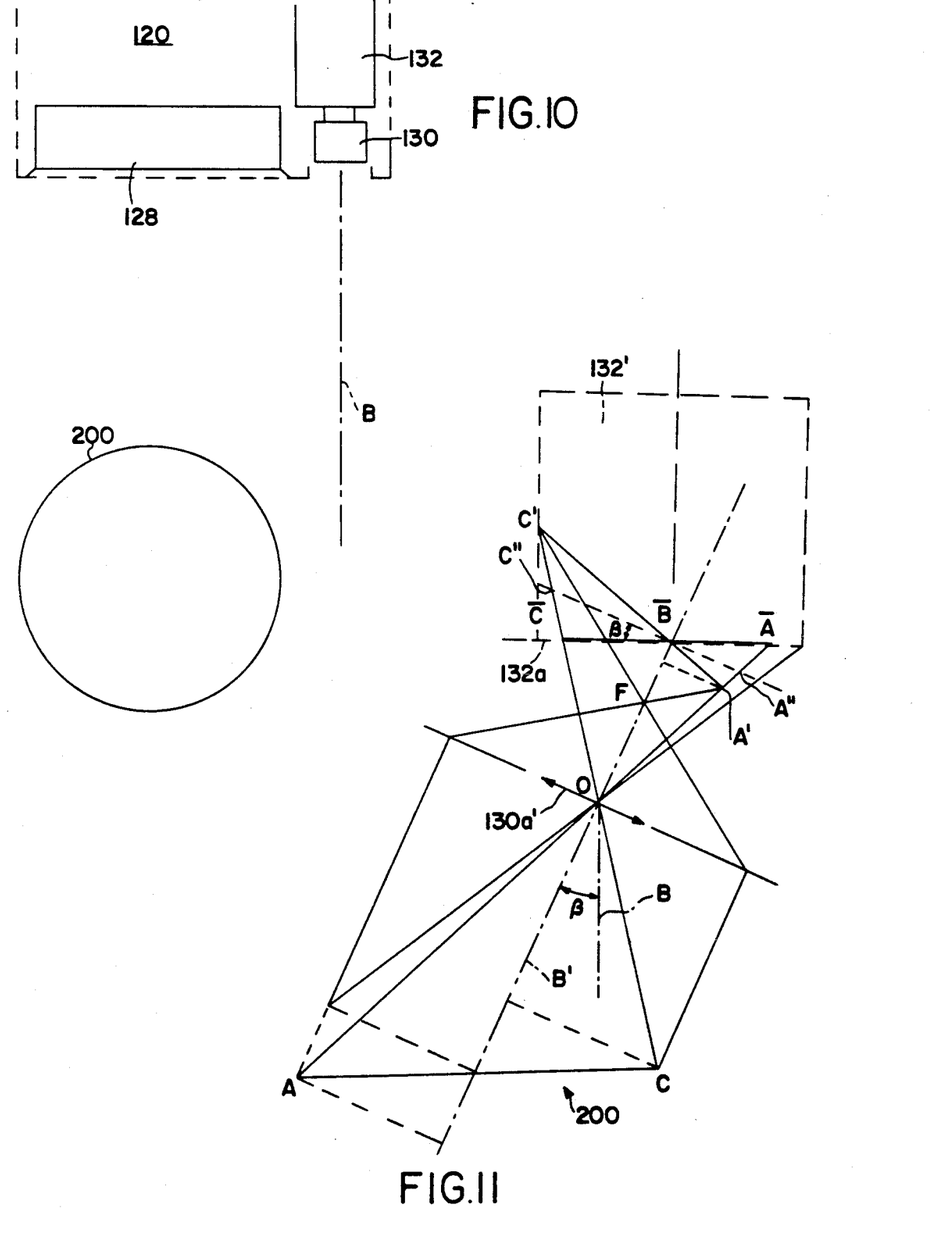
FIG. 10 is a diagrammatic plan view in partial section through the top region of a terminal in accordance with the invention and illustrating the problem of the off-axis position of the subject relative to the aiming direction of the camera.
FIG. 11 is a diagrammatic plan view illustrating the geometry of the solution to this problem as provided by the present invention.

With reference now to FIG. 10, it may be observed that since the screen 128 and the camera lens system 130 are disposed side-by-side, the subject generally tends to be situated in front of the screen and thus to be offset sideways relative to the axis B of the lens system 30, assuming said axis to be perpendicular to the surface of the screen.

In addition to the effect of this offset position, there is also the effect of the camera lens generally having a very short focal length, about 8 mm to 10 mm, thereby deforming parallel lines situated in the field of view due to the parallax effect.

In accordance with another aspect of the present invention, means for compensating this alignment defect and for performing the required parallax correction consist in giving judiciously selected orientations to the lens system and to the plane of the photosensitive element of the camera, as explained below.

Figures 12, 13:
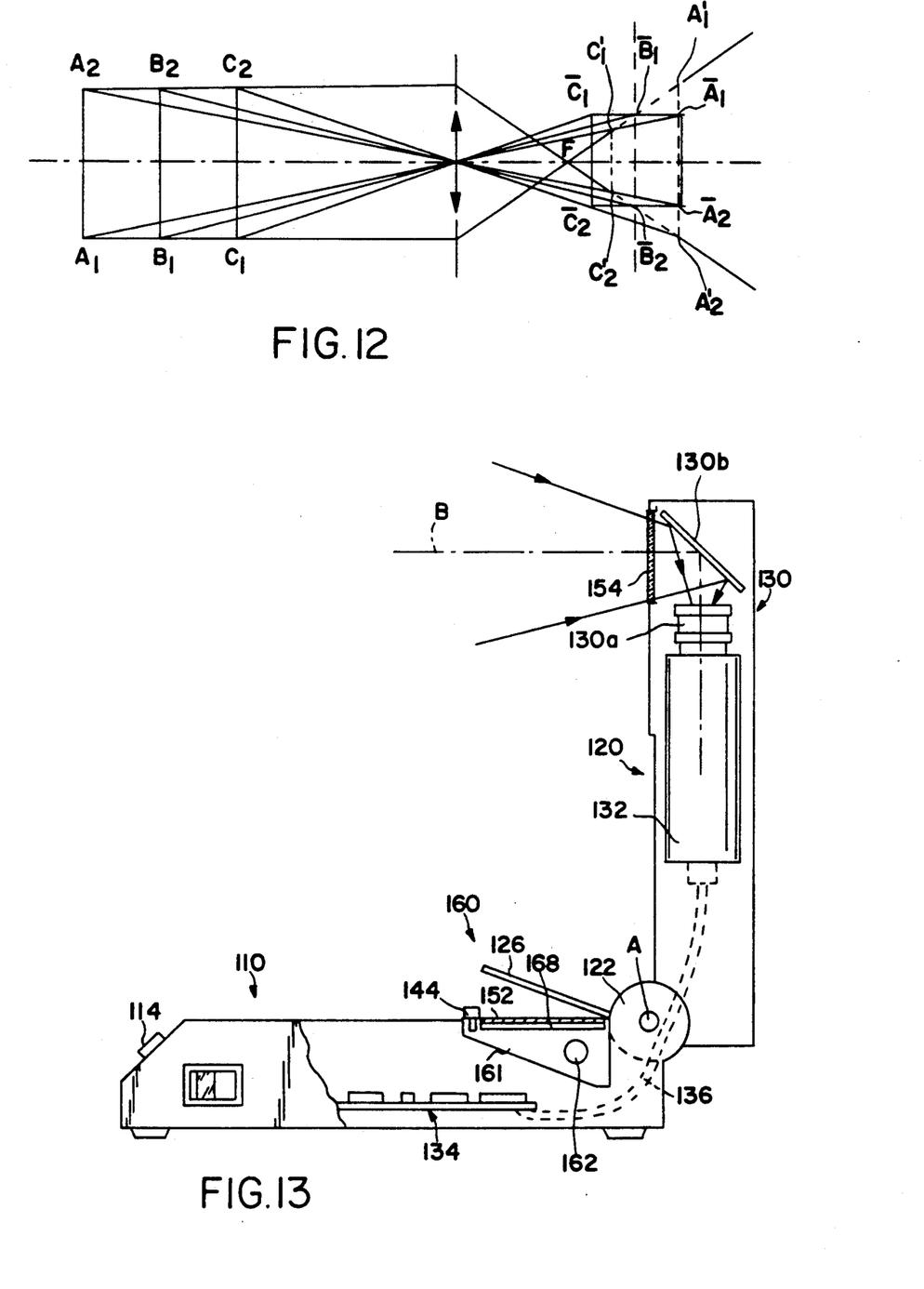
FIG. 12 is a side view of the FIG. 11 diagram.
FIG. 13 is a side view in partial section showing certain details of the terminal shown in FIGS. 3a and 3b.

FIGS. 11 and 12 show the geometry of the solution in accordance with the present invention for mitigating this difficulty.

In accordance with the invention, the axis B' of the lens system, represented by a lens 130a', is deflected by an angle $\beta$ selected as a function, in particular, of the width of the screen 128 and of the distance between the subject 200 and the screen.

The face of the subject 200 and the visible background are represented by a vertical rectangle A1A2C2C1 (merely a straight line AC in FIG. 11) extending parallel to the screen 128, and thus at an angle to the lens system. An image is formed at A'C' (FIG. 11) or A'1A'2C'2C'1 (FIG. 12), and it may be observed that because of the above-mentioned alignment defects, the image is highly trapezoidal. If the light sensitive plane of the camera were to be parallel to the lens 130a', then the image of the rectangle A1A2C2C1 (straight line A"C" in FIG. 11) would still be trapezoidal.

In accordance with the invention, the sensitive plane 132a of the camera is pivoted about a vertical axis contained in said plane and intersecting the axis of the lens system in such a manner that the sensitive plane (the real image plane) is now essentially parallel to the object whose image is to be reproduced (above-mentioned rectangle), i.e., essentially parallel to the screen 128 or to the front face of the terminal.

The image of the object rectangle thus becomes $\overline{A1A2C2C1}$ (FIG. 12) or $\overline{AC}$ (FIG. 11), and is thus also a rectangle, as can be seen from the geometrical lines in FIGS. 11 and 12.

The aiming error due to the fact that the camera takes pictures of the user at an angle is thus compensated simply and cheaply by turning the lens system so that its new aiming direction B' is directed along said angle, while keeping the virtual sensitive plane of the camera essentially parallel to the screen.

In accordance with the invention, means are also provided for assisting the speaker in taking up the proper position relative to the terminal, and in particular relative to the aiming axis of the camera, said means enabling the user to check his or her own picture centering on a continuous basis.

Figure 9:
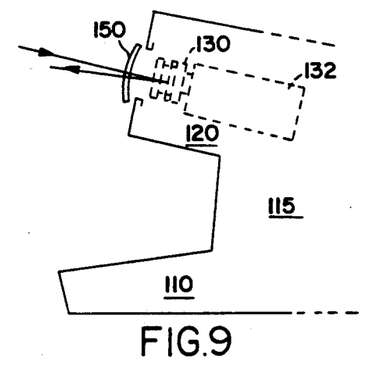
FIG. 9 is a diagrammatic fragmentary side view in section through another auxiliary arrangement in accordance with the present invention.

In accordance with a first aspect of the invention, these means comprise, with reference to FIG. 9, a semi-reflecting mirror 150 placed in front of the camera lens system 130. This mirror is preferably spherical and convex so as to give the user a relatively wide angle image by virtue of the rays it reflects, while the rays it transmits are picked up normally by the camera in order to give rise to the image to be transmitted.

Preferably, one or more marks, e.g., engraved on the glass on the outside surface of the mirror, enable the speaker to take up a position both sideways and vertically so that the image of a portion of the speaker's body, e.g., the head, appears in a predetermined position relative to said mark.

Alternatively, a totally reflecting mirror may be disposed in the vicinity of the camera lens.

Further, it may be observed that the receiving polarizer 154 described above with reference to FIG. 8 could also constitute a semi-reflecting mirror.

For example, the mark may be a circle in which the user is to center the image of his or her own head.

In a variant embodiment of the invention, the means for providing assistance in taking up the correct position are constituted by the monitor screen itself. More precisely, a screen is used having a narrow angle of observation, and the user takes up the appropriate position by moving to a position from which an optimum quality image is seen on the screen. Typically, such a small observation cone may have a half angle at the apex of about 5° to 15°. This may be obtained, for example, by means of a liquid crystal screen.

It may be recalled that a small observation cone liquid crystal screen is characterized by image quality which is severely degraded when the real observation direction is too far off the privileged observation direction perpendicular to the plane of the liquid crystals. More precisely, the effect of changing light polarization by exciting or de-exciting the crystals does not provide satisfactory contrast in the display from the screen when the light rays coming from the screen are at too great an angle to the plane of the screen.

Thus, a well-known drawback of certain types of liquid crystal screen is transformed in the present case to an advantage for facilitating proper alignment of the user relative to the terminal.

Another solution that could be adopted for a small observation cone screen consists in using an ordinary cathode ray tube having a filter at its surface in the form of a microscopic venetian blind or the like, allowing light rays to escape only in the desired observation cone. A grid of crossed horizontal and vertical microscopic venetian blinds may be provided, for example.

FIG. 13 is a side view of the terminal of FIGS. 3a and 3b shown in partial section.

It may be observed that the camera 132 occupies a vertical position and that its lens system 130 is constituted by the lens 130a and a mirror 130b.

This figure also shows the electronic assembly 134 of the terminal, its bundle 136 of cables connecting it to the camera and the screen, the light source 162 received in its cavity 161, the translucent plate 168, and the flap 126 which, by pivoting about the axis A, serves to provide manual adjustment of the direction of the auxiliary lighting beam, while displacing the cursor 144 allows the intensity thereof to be adjusted. This figure also shows the polarizer 152 lying against the translucent plate 168, and the receiving polarizer 154 placed ahead of the mirror 130b.

Finally, it may be observed that a videophone type terminal in accordance with the invention may be used either in association with a conventional type of telephone set via an appropriate interconnection (application to the terminal of FIG. 1), or else it may have a telephone set integrally mounted therein (as shown in FIG. 2). It is preferable for the "hands free" function to be available so as to enable communication to take place by sound and image of the speaker without the speaker having to hold a handset.

Naturally, the invention is not limited to the embodiments and variants described above and shown in the drawings, and the person skilled in the art will be able to apply numerous variations and modifications while remaining within the scope of the claims.

The present invention is applicable to terminals of any shape, size, architecture and internal organization.

We claim:

1. A table-top terminal for sound and vision communications, for use in an environment having overhead ambient lighting, of a type associated with a telephone set, and comprising a case having a part extending essentially vertically and facing a speaker, said part having a top region including a camera with a lens system and a display screen, said terminal further including manual control means and an electronic assembly for purposes of control, coding/decoding, and interfacing with a transmission line, wherein said terminal further includes an auxiliary lighting device located in a bottom region of said part of said case and at a level lower than a head of said speaker, and capable of emitting light which is directed upwardly towards a face of said speaker, so as to attenuate shadows which would otherwise appear on said face of said speaker due to said overhead ambient lighting, said auxiliary lighting device comprising a light source, a reflector and vertical deflection means for vertically deflecting light rays, and means for varying light flux emitted by said auxiliary lighting device so as to adjust said attenuation.

2. A terminal according to claim 1, wherein said auxiliary lighting device further includes a translucent plate constituting a diffuser.

3. A terminal according to claim 1, wherein said vertical deflection means comprise a set of prisms.

4. A terminal according to claim 1, wherein said vertical deflection means comprise horizontal louvers of adjustable orientation.

5. A terminal according to claim 1, wherein said case further includes a substantially horizontal reflecting surface extending in front of and below said light source for reflecting upwardly light rays emitted from said light source by reflection of a downward beam of said horizontal reflecting surface.

6. A terminal according to claim 1, wherein said adjusting means act on the intensity of said light source.

7. A terminal according to claim 1, wherein said adjusting means include at least one moving shutter-forming plane surface.

8. A terminal according to claim 1, wherein said case includes a fixed part via which said terminal rests on a support surface, and a moving part hinged about a substantially horizontal axis to said fixed part and constituting a top part in which said display screen and said lens assembly are located, said auxiliary lighting device being situated in said fixed part in the vicinity of the hinge.

9. A terminal according to claim 1, wherein said adjusting means are manual.

10. a terminal according to claim 1, wherein said adjusting means are automatic and include at least one photosensitive sensor.

11. A terminal according to claim 1, further comprising a first polarizer placed in front of said lighting device and a second polarizer placed in front of said lens system.

12. A terminal according to claim 1, wherein said lens system is displaced laterally from said display screen, and said terminal further comprises parallax correction means.

13. A terminal according to claim 1, further including positioning assistance means for assisting the speaker in obtaining a proper position relative to an aiming axis of said camera.

14. A terminal according to claim 13, wherein said positioning assistance means comprise a mirror disposed at the inlet to or in the vicinity of said lens system.

15. A terminal according to claim 13, wherein said positioning assistance means are constituted by said screen.

16. A terminal according to claim 1, further including means for temporarily displaying on said screen the image taken by said camera, and manual control means enabling the speaker to obtain a proper balance of the speaker's own image.

* * * * *

UNITED STATES PATENT AND TRADEMARK OFFICE
CERTIFICATE OF CORRECTION

PATENT NO.   : 5,142,562
DATED        : August 25, 1992
INVENTOR(S)  : Guichard et al It is certified that error appears in the above-identified patent and that said Letters Patent is hereby corrected as shown below:

Title page, under item [56] col. 2, line 3,
The priority data should be included as follows:

--French Patent Application No. 87 13315, filed
    September 25, 1987.--

Signed and Sealed this

Twenty-second Day of February, 1994

Attest:

BRUCE LEHMAN

*Attesting Officer*  *Commissioner of Patents and Trademarks*